(12) United States Patent
Le Saux

(10) Patent No.: US 12,013,597 B2
(45) Date of Patent: Jun. 18, 2024

(54) LENS ELEMENT

(71) Applicant: Essilor International, Charenton-le-Pont (FR)

(72) Inventor: Gilles Le Saux, Charenton-le-Pont (FR)

(73) Assignee: Essilor International, Charenton-le-Pont (FR)

(*) Notice: Subject to any disclaimer, the term of this patent is extended or adjusted under 35 U.S.C. 154(b) by 765 days.

(21) Appl. No.: 17/253,408

(22) PCT Filed: Jun. 20, 2019

(86) PCT No.: PCT/EP2019/066403
§ 371 (c)(1),
(2) Date: Dec. 17, 2020

(87) PCT Pub. No.: WO2019/243542
PCT Pub. Date: Dec. 26, 2019

(65) Prior Publication Data
US 2021/0263337 A1 Aug. 26, 2021

(30) Foreign Application Priority Data
Jun. 20, 2018 (EP) .................................. 18305783

(51) Int. Cl.
*G02C 7/02* (2006.01)
*G02C 7/06* (2006.01)
(52) U.S. Cl.
CPC ............. *G02C 7/025* (2013.01); *G02C 7/027* (2013.01); *G02C 7/06* (2013.01)
(58) Field of Classification Search
CPC .......... G02C 7/025; G02C 7/027; G02C 7/06; G02C 2202/20; G02C 2202/24; B29D 11/00009
See application file for complete search history.

(56) References Cited

U.S. PATENT DOCUMENTS

| 4,637,697 A | 1/1987 | Freeman |
|---|---|---|
| 5,100,226 A | 3/1992 | Freeman |

(Continued)

FOREIGN PATENT DOCUMENTS

| AU | 644126 B | 12/1993 |
|---|---|---|
| CN | 107077007 A | 8/2017 |

(Continued)

OTHER PUBLICATIONS

International Search Report and Written Opinion dated Sep. 4, 2019 in PCT/EP2019/066403 filed on June 20, 2019, 15 total pages.

(Continued)

*Primary Examiner* — James C. Jones
(74) *Attorney, Agent, or Firm* — Oblon, McClelland, Maier & Neustadt, L.L.P.

(57) ABSTRACT

A method for manufacturing a lens element intended to be worn in front of an eye of a wearer, the method comprising obtaining a lens member comprising a holographic recording medium disposed on a first surface of the lens member, the holographic recording medium being configured to be able to convert an interference pattern into a holographic optical element, obtaining wearer prescription data relating at least to the prescription of the wearer, manufacturing a second surface of the lens member based on the wearer prescription data, and recording a holographic optical element within the holographic recording medium so as to provide an additional optical power of opposite sign to the prescribed optical power so as to slow down the progression of the abnormal refraction of the eye.

11 Claims, 2 Drawing Sheets

(56) References Cited

U.S. PATENT DOCUMENTS

| | | |
|---|---|---|
| 5,997,140 A | 12/1999 | Zhang et al. |
| RE43,851 E | 12/2012 | To et al. |
| RE45,147 E | 9/2014 | To et al. |
| RE47,006 E | 8/2018 | To et al. |
| 2001/0050751 A1* | 12/2001 | Banyai ............ G02B 3/10 430/1 |
| 2005/0105047 A1* | 5/2005 | Smitth, III ............ G02C 7/04 351/159.07 |
| 2006/0082729 A1 | 4/2006 | To et al. |
| 2012/0176582 A1 | 7/2012 | Back et al. |
| 2012/0231376 A1 | 9/2012 | Rölle et al. |
| 2014/0126029 A1 | 5/2014 | Fuetterer |
| 2015/0301356 A1 | 10/2015 | Tabirian et al. |
| 2016/0349517 A1 | 12/2016 | Miyasaka et al. |
| 2017/0068095 A1 | 3/2017 | Holland et al. |
| 2017/0075139 A1 | 3/2017 | Sessner et al. |
| 2017/0131567 A1 | 5/2017 | To et al. |
| 2017/0276961 A1 | 9/2017 | Wooley et al. |
| 2017/0336653 A1 | 11/2017 | Bakaraju |
| 2018/0045966 A1 | 2/2018 | Holland et al. |
| 2018/0052328 A1 | 2/2018 | Holland et al. |
| 2018/0059422 A1 | 3/2018 | Holland et al. |
| 2018/0095279 A1 | 4/2018 | Bouchier et al. |
| 2018/0107003 A1 | 4/2018 | Holland et al. |
| 2018/0107004 A1 | 4/2018 | Holland et al. |
| 2018/0113314 A1 | 4/2018 | Holland et al. |

FOREIGN PATENT DOCUMENTS

| | | |
|---|---|---|
| EP | 0 375 291 A2 | 6/1990 |
| EP | 3 223 064 A1 | 9/2017 |
| GB | 2 129 157 A | 5/1984 |
| GB | 2 154 759 A | 9/1985 |
| JP | 4-50813 A | 2/1992 |
| JP | 2002-500379 A | 1/2002 |
| JP | 2007-511803 A | 5/2007 |
| JP | 2007-310328 A | 11/2007 |
| JP | 2014-519060 A | 8/2014 |
| JP | WO2015/125794 A | 8/2015 |
| JP | 20016-145352 A | 8/2016 |
| JP | 2017-529128 A | 10/2017 |
| WO | WO 99/34239 A2 | 7/1999 |
| WO | WO 02/054137 A2 | 7/2002 |
| WO | WO 2017/106692 A1 | 6/2017 |

OTHER PUBLICATIONS

Extended European Search Report dated Sep. 27, 2018 in European Patent Application No. 18305783.5, 11 pages.

Japanese Office Action dated Apr. 17, 2023 in Japanese Patent Application No. 2020-570415 (with English transiation), 9 pages.

\* cited by examiner

LENS ELEMENT

TECHNICAL FIELD

The invention relates to a lens element intended to be worn in front of an eye of a person to suppress or reduce progression of abnormal refractions of the eye such as myopia or hyperopia. The invention further relates to a lens member comprising a first optical surface having a surface design and a second optical surface to be manufactured.

BACKGROUND OF THE INVENTION

Myopia of an eye is characterized by the fact that the eye focuses distant objects in front of its retina, hypermetropia is characterized by the fact that the eye focuses distant objects behind of its retina. Myopia is usually corrected using a concave lens providing negative dioptric power and hypermetropia is usually corrected using a convex lens providing positive dioptric power.

It has been observed that some individuals when corrected using conventional single vision optical lenses, in particular children, focus inaccurately when they observe an object which is situated at a short distance away, that is to say, in near vision conditions. Because of this focusing defect on the part of a myopic child which is corrected for his far vision, the image of an object close by is also formed behind his retina, even in the foveal area.

Such focusing defect may have an impact on the progression of myopia of such individuals. One may observe that for most of said individual the myopia defect tends to increase over time partly caused by long and intensive near work sessions.

In particular, studies carried out on monkeys have shown that strong defocusing of the light behind the retina, which occurs away from the foveal zone, may cause the eye to extend and therefore may cause a myopia defect to increase.

Therefore, it appears that there is a need for a lens element that would suppress or at least slow down progression of abnormal refractions of the eye such as myopia or hyperopia.

SUMMARY OF THE INVENTION

To this end, the invention proposes a lens element intended to be worn in front of an eye of a wearer comprising:
- a refractive element configured to provide to the wearer, for example in standard wearing conditions and for foveal vision, a first optical power based on a prescription of the wearer for correcting an abnormal refraction of said eye of the wearer, the prescription comprising at least a prescribed optical power adapted to the wearer;
- at least one holographic optical element providing an additional optical power of opposite sign to the prescribed optical power so as to slow down the progression of the abnormal refraction of the eye.

Advantageously, having a holographic optical element that provides an additional optical power of opposite sign to the prescribed optical power reduce the natural tendency of the retina of the eye to deform, in particular to extend. Therefore, the progression of the abnormal refraction of the eye is slow down.

Furthermore, a holographic optical element has the advantage of being inconspicuous and allows measuring the first optical power using conventional means, such as a focimeter.

According to further embodiments which can be considered alone or in combination:
- the at least one holographic optical element provides over a portion of the visible spectrum an additional optical power greater than or equal to 0.25 diopters, for example greater than or equal to 1.5 diopters, in absolute value; and/or
- the abnormal refraction of the eye of the wearer corresponds to myopia, the additional optical power is positive and the holographic optical element is configured to provide the effect of a refractive converging lens on the light coming from at least one object; and/or
- the abnormal refraction of the eye of the wearer corresponds to hypermetropia, the additional optical power is negative and the holographic optical element is configured to provide the effect of a refractive divergent lens on the light coming from at least one object; and/or
- the at least one object is located at a finite distance of the holographic optical element; and/or
- the at least one object is located at infinite distance of the holographic optical element; and/or
- the lens element further comprises at least two holographic optical elements, the first holographic optical element being configured to provide the effect of a refractive lens on the light coming from an object at a finite distance of the holographic optical element and the second holographic optical element being configured to provide the effect of a refractive lens on the light coming from an object at infinite distance of the holographic optical element; and/or
- the at least one holographic optical element has a cylindrical power; and/or
- the at least one holographic optical element is located on the front surface of the lens element; and/or
- the at least one holographic optical element is located on the back surface of the lens element; and/or
- the at least one holographic optical element is located between the front and the back surfaces of the lens element; and/or
- the at least one holographic optical element has an alternation of concentric annular section having an optical power greater than or equal to 0.25 diopter and concentric annular section having an optical power smaller than or equal to 0.1 diopter; and/or
- the lens element further comprises at least two holographic optical elements having different portion of effective visible spectrum and/or angular band; and/or
- the at least two holographic optical elements are configured to provide the same additional optical power; and/or
- the at least two holographic optical elements are configured to provide different additional optical powers; and/or
- the at least two holographic optical elements have different positions between the front and back surfaces of the lens element; and/or
- the lens element has a near vision reference point and the at least one holographic optical element extends over said near vision reference point; and/or
- the at least one holographic optical element has an efficiency greater than or equal to 10% on the effective visible spectrum; and/or
- the holographic element is configured to provide the additional optical power to light rays passing through said holographic element; and/or the holographic element is configured to provide the additional optical power to light rays reflected by said holographic element; and/or the at least one holographic optical element has an alternation of concentric annular section having an optical power greater than or equal to 0.5 diopter and concentric annular section having an optical power smaller than or equal to 0.1 diopter.

The invention also relates to an eyewear equipment intended to be worn by a wearer, the eyewear equipment having a lens element according to the invention.

The eyewear equipment may be a spectacle frame, a helmet, a mask or any head up device.

The invention further relates to a lens member comprising:

a first optical surface having a surface design,
a second optical surface to be manufactured, and
a holographic recording medium configured to be able to convert an interference pattern into a holographic optical element.

Advantageously, such lens member may be used to obtain a lens element according to the invention.

According to further embodiments which can be considered alone or in combination:

the holographic recording medium is located on the first optical surface; and/or the holographic recording medium is located between the first and second optical surfaces; and/or the holographic recording medium is plane or has the same shape as the first optical surface; and/or the holographic recording medium extends over the geometrical center of the first optical surface; and/or the holographic recording medium has a surface area greater than 10% of the surface area of the first optical surface; and/or the lens member further comprises a plurality of holographic recording media, each holographic recording medium being configured to be able to convert an interference pattern into a holographic optical element over different portions of the visible spectrum.

The invention further relates to a lens member comprising:

a first optical surface having a surface design,
a second optical surface to be manufactured, and
at least one holographic optical element providing over a portion of the visible spectrum an optical power.

Advantageously, such lens member may be used to obtain a lens element according to the invention.

According to further embodiments which can be considered alone or in combination:

the at least one holographic optical element provides an optical power greater than or equal to 0.25 diopters, for example greater than or equal to 1.5 diopters; and/or at least one holographic optical element is located on the first optical surface; and/or the at least one holographic optical element is located between the first and second optical surfaces; and/or the at least one holographic optical element comprises and extends around the geometrical center of the first optical surface; and/or the at least one holographic optical element has a surface area greater than 10% of the surface area of the first optical surface; and/or the lens member further comprises at least two holographic optical elements having different portions of effective visible spectrum and/or angular band.

The invention further relates to a method for manufacturing a lens element intended to be worn in front of an eye of a wearer, the method comprising:

obtaining a lens member comprising a holographic recording medium disposed on a first surface of the lens member, the holographic recording medium being configured to be able to convert an interference pattern into a holographic optical element;

obtaining wearer prescription data relating at least to the prescription of the wearer;

manufacturing a second surface of the lens member based on the wearer prescription data;

recording a holographic optical element within the holographic recording medium so as to provide an additional optical power of opposite sign to the prescribed optical power so as to slow down the progression of the abnormal refraction of the eye.

Advantageously, the method according to the invention allows simplifying and facilitating the manufacturing process of a lens element comprising a holographic optical element.

According to further embodiments of the invention which can be considered alone or in combination:

the first optical surface corresponds to the front surface of the lens member and/or the back surface of the lens member and/or a surface comprised between the front and the back surfaces; and/or the step of manufacturing the second surface of the lens member is performed before the step of recording the holographic optical element; and/or the abnormal refraction of the eye of the wearer corresponds to myopia, the additional optical power is positive and the holographic optical element is recorded to provide the effect of a refractive converging lens on the light coming from at least one object; and/or the abnormal refraction of the eye of the wearer corresponds to hypermetropia, the additional optical power is negative and the holographic optical element is recorded to provide the effect of a refractive divergent lens on the light coming from at least one object; and/or the at least one object is located at a finite distance of the holographic optical element; and/or the at least one object is located at infinite distance of the holographic optical element; and/or the step of recording a holographic optical element comprises at least recording a first holographic optical element, the first holographic optical element being configured to provide the effect of a refractive lens on the light coming from an object at a finite distance of the holographic optical element, and recording a second holographic optical element, the second holographic optical element being configured to provide the effect of a refractive lens on the light coming from an object at infinite distance of the holographic optical element; and/or the step of recording a holographic optical element comprises at least recording a first holographic optical element and recording at least a second holographic optical element, the holographic optical elements being recorded to have different portion of effective visible spectrum and/or angular band; and/or at least two holographic optical elements are recorded to provide the same additional optical power; and/or the lens member comprises a near vision reference point and the at least one holographic optical element is recorded to extend over said near vision reference point.

BRIEF DESCRIPTION OF THE DRAWINGS

Non-limiting embodiments of the invention will now be described with reference to the accompanying drawing wherein.

Elements in the figures are illustrated for simplicity and clarity and have not necessarily been drawn to scale. For example, the dimensions of some of the elements in the figure may be exaggerated relative to other elements to help to improve the understanding of the embodiments of the present invention.

DETAILED DESCRIPTION OF EMBODIMENTS OF THE INVENTION

The invention relates to a lens element intended to be worn in front of an eye of a wearer.

In the reminder of the description, terms like «up», «bottom», «horizontal», «vertical», «above», «below», «front», «rear» or other words indicating relative position may be used. These terms must be understood in the wearing conditions of the lens element.

In the context of the present invention, the term "lens element" can refer to an uncut optical lens or a spectacle optical lens edged to fit a specific spectacle frame or an ophthalmic lens and an optical device adapted to be positioned on the ophthalmic lens.

A lens element according to the invention is adapted for a wearer and intended to be worn in front of an eye of said wearer. Although, the invention is described in detail for abnormal refraction being myopia, the invention applies for abnormal refraction being hypermetropia. The skilled person may adapt the description for hypermetropia.

Figure 1:
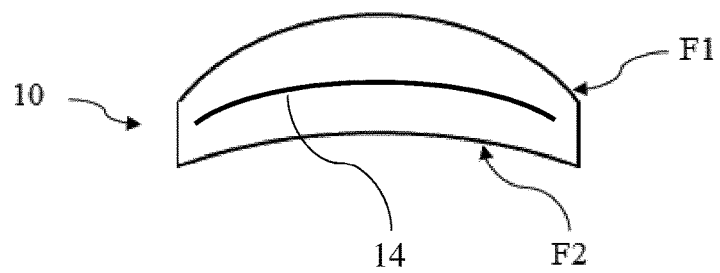
FIG. 1 is a general profile view of a lens element according to an embodiment of the invention.

As represented on FIG. 1, a lens element 10 according to the invention comprises:
a refractive element 12, and
at least one holographic element 14.

The lens element 10 illustrated on FIG. 1 comprises a front or "object side" surface F1 formed as a convex curved surface toward an object side, and a back or "eye side" surface F2 formed as a concave surface having a different curvature than the curvature of the object side surface F1.

Although the front surface is represented as convex and the back surface is represented as concave on FIG. 1, the invention is not limited to such configuration.

The refractive element 12 is configured to provide to the wearer, for example in standard wearing conditions and for foveal vision, a first optical power based on the prescription of the wearer for correcting an abnormal refraction of said eye of the wearer.

The wearing conditions are to be understood as the position of the lens element with relation to the eye of a wearer, for example defined by a pantoscopic angle, a Cornea to lens distance, a Pupil-cornea distance, a centre of rotation of the eye (CRE) to pupil distance, a CRE to lens distance and a wrap angle.

The Cornea to lens distance is the distance along the visual axis of the eye in the primary position (usually taken to be the horizontal) between the cornea and the back surface of the lens; for example equal to 12 mm.

The Pupil-cornea distance is the distance along the visual axis of the eye between its pupil and cornea; usually equal to 2 mm.

The CRE to pupil distance is the distance along the visual axis of the eye between its center of rotation (CRE) and cornea; for example equal to 11.5 mm.

The CRE to lens distance is the distance along the visual axis of the eye in the primary position (usually taken to be the horizontal) between the CRE of the eye and the back surface of the lens, for example equal to 25.5 mm.

The pantoscopic angle is the angle in the vertical plane, at the intersection between the back surface of the lens and the visual axis of the eye in the primary position (usually taken to be the horizontal), between the normal to the back surface of the lens and the visual axis of the eye in the primary position; for example equal to 8°.

The wrap angle is the angle in the horizontal plane, at the intersection between the back surface of the lens and the visual axis of the eye in the primary position (usually taken to be the horizontal), between the normal to the back surface of the lens and the visual axis of the eye in the primary position for example equal to 0°.

An example of standard wearer condition may be defined by a pantoscopic angle of 8°, a Cornea to lens distance of 12 mm, a Pupil-cornea distance of 2 mm, a CRE to pupil distance of 11.5 mm, a CRE to lens distance of 25.5 mm and a wrap angle of 0°.

The term "prescription" is to be understood to mean a set of optical characteristics of optical powers, of astigmatism, of prismatic deviation, determined by an ophthalmologist or optometrist in order to correct the vision defects of the eye, for example by means of a lens positioned in front of his eye. For example, the prescription for a myopic eye comprises the values of optical power and of astigmatism including amplitude and axis for the distance vision.

Although the invention is not limited to progressive lenses, the wording used in this description is illustrated in FIGS. 1 to 10 of document WO2016/146590 for a progressive lens. The skilled person can adapt the definitions for single vision lenses.

The refractive element may be configured to provide a single optical power and/or an astigmatism including amplitude and axis values corresponding to the prescribed optical power for the wearer.

The refractive element may have a continuous variation of optical power. For example, the refractive element may have a progressive addition design.

The optical design of the refractive element may comprise
a fitting cross where the optical power is negative,
a first zone extending in the temporal side of the refractive element when the lens element is being worn by a wearer. In the first zone, the optical power increases when moving towards the temporal side, and over the nasal side of the lens, the optical power of is substantially the same as at the fitting Cross.

Such optical design is disclosed in greater details in WO2016/107919.

The at least one holographic optical element 14 provides an additional optical power of opposite sign to the prescribed optical power so as to slow down the progression of the abnormal refraction of the eye.

In the sense of the invention a "holographic optical element" modifies the amplitude and/or the phase and/or polarization of a light beam transmitted through or reflected by said holographic optical element.

The holographic optical element may be configured to provide the additional optical power to light rays passing through said holographic element. According to such embodiment, the holographic optical element is configured to provide the additional optical power to light coming from the environment of the wearer when wearing the lens element.

Alternatively, the holographic element is configured to provide the optical power to light rays reflected by said holographic element. According to such embodiment, the optical lens element is mounted on a head mounted device, for example a spectacle frame, comprising a light source, or more generally an image generator. The head mounted device is configured so that the light rays from the light source are reflected on the holographic optical element towards the eye of the wearer when wearing the lens element.

Advantageously, having a holographic optical element that provides an additional optical power of opposite sign to the prescribed optical power creates an image in front of the retina that acts as a stop signal for the eye growth reduces the deformation of the retina of the eye of the wearer, in particular in peripheral vision, allowing to slow down the progression of the abnormal refraction of the eye of the person wearing the lens element.

The additional optical power is positive when the abnormal refraction of the eye of the wearer corresponds to myopia, and the holographic optical element is configured to provide the effect of a refractive converging lens on the light coming from at least one object.

The additional optical power is negative when the abnormal refraction of the eye of the wearer corresponds to hypermetropia and the holographic optical element is configured to provide the effect of a refractive divergent lens on the light coming from at least one object.

The at least one object may be located at a finite distance of the holographic optical element or alternatively the at least one object may be located a infinite distance of the holographic optical element.

According to a preferred embodiment of the invention, the holographic optical element provides over a portion of the visible spectrum an additional optical power greater than or equal to 0.25 diopters in absolute value, for example greater than or equal to 0.5 diopters in absolute value, for example greater than or equal to 1.5 diopters in absolute value to the light that passes through or is reflected by the holographic optical element.

The holographic optical element may have an optical function that in addition to providing an additional optical power also provides cylindrical power.

In the example represented on FIG. 1, the holographic optical element 14 is located between the front and back surfaces of the lens element 10. The holographic optical element 14 may have a plane shape or any curve shape.

Alternatively, the holographic optical element may be located on the front surface F1 of the lens element.

Furthermore, the holographic optical element may be located on the back surface F2 of the optical element.

Preferably, the at least one holographic optical element has an efficiency greater than or equal to 10% on the effective visible spectrum.

Preferably, the at least one holographic optical element is configured to have the greatest angular band as possible.

The holographic optical element may have an alternation of concentric annular section having an optical power greater than or equal to 0.25 diopter and concentric annular section having an optical power smaller than or equal to 0.1 diopter.

According to an embodiment of the invention, the lens element has a near vision reference point and the holographic optical element extends over said near vision reference point.

The near vision reference point is a point of the lens element, through which the gaze direction of wearer is to pass when the wearer is gazing at an object at about 40 cm in standard wearer conditions.

Advantageously, having the holographic element located in the near vision zone of the lens element helps to slow down the progression of abnormal refraction of the eye while reducing the size of the holographic optical element. Indeed, the inventors have observed that the efficiency of the holographic optical element is greater when placed in the near vision zone.

The lens element may be divided in a plurality of zones.

Figure 2:
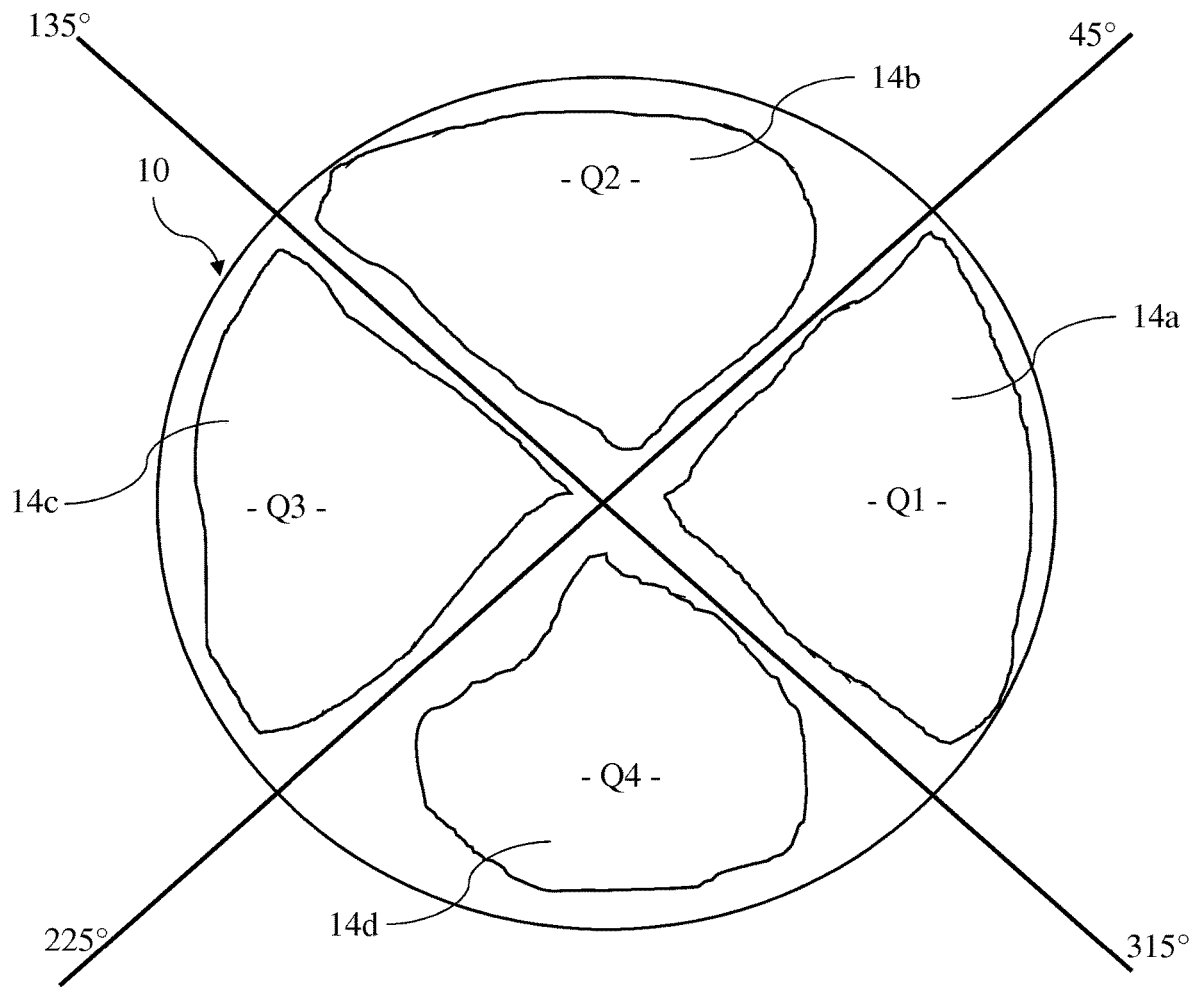
FIG. 2 is a plan view of a lens element according to an embodiment of the invention.

For example, as represented on FIG. 2, the lens element may be divided in four quadrants Q1, Q2, Q3, Q4 at 45°.

In the sense of the invention the "quadrants at 45°" are to be understood as equal angular quadrant of 90° oriented in the directions 45°/225° and 135°/315° according to the TABO convention as illustrated on FIG. 2.

According to an embodiment of the invention each quadrant may comprise a holographic optical element providing a different optical power.

For example, the first quadrant Q1 may comprise a holographic element providing an additional optical power of 0.5 diopters, the second quadrant Q2 may comprise a holographic element providing an additional optical power of 1 diopters, the third quadrant Q3 may comprise a holographic element providing an additional optical power of 1.5 diopters and the fourth quadrant Q4 may comprise a holographic element providing an additional optical power of 2 diopters.

Advantageously, when the optical design of the refractive element is rotationally symmetrical, such arrangements allows adapting the additional optical power by simply rotating the lens element so as to have the quadrant having the desired additional optical power positioned as the near vision zone, i.e. in the lower position.

As illustrated on FIG. 2, the lens element may comprise a plurality of holographic optical elements 14a to 14d.

In the example represented on FIG. 2, the different holographic elements have different positions and provide different additional optical power.

Usually a holographic optical element is recorded using an interference pattern with a given angle of incidence and using a monochromatic light source such as a laser.

Therefore, a holographic optical element has an effective visible spectrum around the wavelength of the monochromatic light source used to record said holographic element and an angular band around the angle of incidence used to record said holographic element.

According to an embodiment of the invention, the lens element may further comprise at least two holographic optical elements having different portions of effective visible spectrum and/or angular band.

Therefore, the overall portion of effective visible spectrum and/or angular band is increased.

The at least two holographic optical elements may be configured to provide the effect of a refractive lens on the light coming from difference object at different distances.

For example, a first holographic optical element may be configured to provide the effect of a refractive lens on the light coming from an object at a finite distance of the holographic optical element and a second holographic optical element being configured to provide the effect of a refractive lens on the light coming from an object at infinite distance of the holographic optical element.

The different holographic optical elements may be configured to provide different additional optical powers as in the example represented on FIG. 2.

Alternatively, the different holographic optical elements may be configured to provide the same additional optical power.

In the sense of the invention, the two optical powers are considered different when the difference between the two optical powers is greater than or equal to 0.25 D.

The different holographic optical elements may have different positions between the front and back surfaces of the lens element, i.e. along the optical axis of the lens element and/or on the lens element, i.e. in the plane perpendicular to the optical lens element.

The plurality of holographic optical elements may be non-contiguous holographic optical elements.

In the sense of the invention two holographic optical elements are non-contiguous if for all the paths linking the two holographic optical elements one may measure at least along part of each path the refractive power based on a prescription for the eye of the person.

The plurality of holographic optical elements 14 may comprise at least two holographic optical elements that are contiguous.

In the sense of the invention, two holographic optical elements are contiguous if there is a path linking the two holographic optical elements along part of said path one may not measure the refractive power based on a prescription for the eye of the person.

Figure 3:
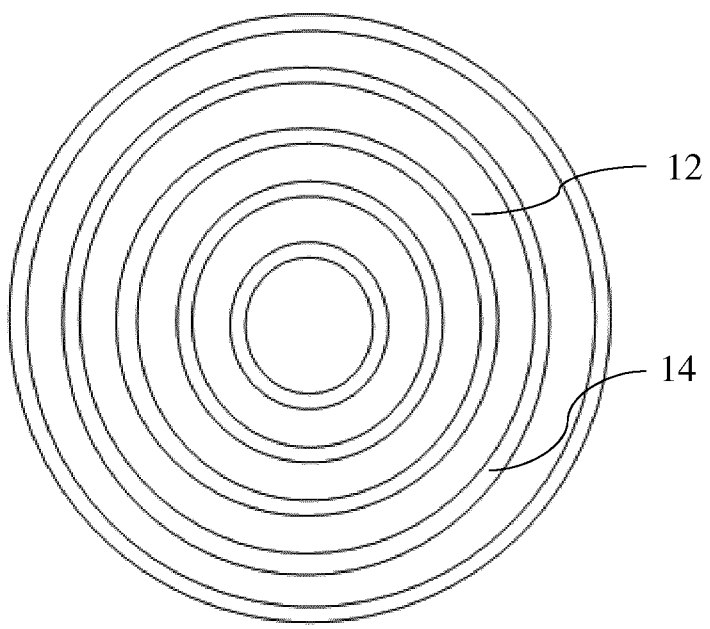
FIG. 3 illustrates a holographic optical element according to an embodiment of the invention.

As illustrated on FIG. 3, the holographic optical elements 14 may be positioned along a set of concentric rings on the refractive element 12. The optical power and/or cylinder of the holographic optical elements may be different depending on their position along the concentric rings.

The optical function holographic optical elements correspond to part of pure cylindrical concentric rings. In this example, the holographic optical elements have an optical function having constant power but a variable cylindrical axis.

The embodiment described in reference to FIG. 3 with concentric rings may be combined with the embodiment of FIG. 2 with a plurality of zones such as four quadrants.

The lens element according to the invention may be a tinted or not. The lens element may comprise a photochromic layer and/or a polarizing layer, preferably on the object side of the lens element.

The invention further relates to a lens member comprising:
 a first optical surface having a surface design,
 a second optical surface to be manufactured, and
 a holographic recording medium configured to be able to convert an interference pattern into a holographic optical element.

The holographic recording medium may be a holographic film or a holographic varnish.

According to an embodiment of the invention, the holographic recording medium may be located on the first optical surface. Advantageously, the holographic medium is easily accessible and the second optical surface may be manufactured using standard manufacturing process.

According to an embodiment, the holographic recording medium is located between the first and second optical surfaces. Advantageously, the holographic medium is protected.

According to such embodiment, the holographic recording medium may be plane or have the same shape as the first optical surface.

Preferably, the holographic recording medium extends over the geometrical center of the first optical surface. In the sense of the invention, the holographic recording medium is considered to extend over the geometrical center of the first optical surface if the line perpendicular to the first optical surface and passing through said geometrical center passes through the holographic medium.

According to an embodiment of the invention, the holographic recording medium has a surface area greater than 10% of the surface area of the first optical surface.

The lens member may comprise a plurality of holographic recording media, each holographic recording medium being configured to be able to convert an interference pattern into a holographic optical element over different portions of the visible spectrum.

The invention further relates to a method of manufacturing a lens element according to the invention, the method comprises:
 a lens member providing step,
 a holographic recording step, and
 a lens manufacturing step.

During the lens member providing step a lens member according to the invention having a holographic recording medium is provided.

The lens member may be selected based on the surface design of the first optical surface.

During the holographic recording step, a holographic optical element is recorded within the holographic recording medium so as to provide an optical function having an additional optical greater than or equal to 0.25 diopters, for example greater than or equal to 1.5 diopters.

During the manufacturing step the second surface of the lens member is manufactured based on the prescription of the wearer so as to obtain a lens element.

The holographic recording step and the lens manufacturing step may be interchanged. In other words, the lens manufacturing step may be carried out before the holographic recording step.

The hologram may be recorded on a holographic layer and added to the lens member using the same type of process than for adding a polarizing layer.

The invention also relates to a method for manufacturing a lens element intended to be worn in front of an eye of a wearer.

The method for manufacturing a lens element comprises a step of obtaining a lens member comprising a holographic recording medium disposed on a first surface of the lens member.

According to different embodiments of the invention, the first optical surface may correspond to the front surface of the lens member and/or the back surface of the lens member and/or a surface comprised between the front and the back surfaces.

In the sense of the invention, the back surface of a lens refers to the surface of the lens facing the eye of the wearer when he wears the lens. The front surface corresponds to the surface opposed to the back surface, which is thereby facing the environment of the wearer.

The holographic recording medium is configured to be able to convert an interference pattern into a holographic optical element. In other words, prior to be recorded, the holographic recording medium does not provide an additional optical power to the lens member.

The holographic recording medium may be a holographic film or a holographic varnish.

The lens member may comprise a near vision reference point.

The method for manufacturing a lens element further comprises a step of obtaining wearer prescription data. The wearer data relates at least to the prescription of the wearer.

The method for manufacturing a lens element may further comprise a step of obtaining wearing condition data. The wearing condition data may relate to wearing conditions measured on the wearer or customized for example based on morphological or postural data relating to the wearer.

The method for manufacturing a lens element may further comprise a step of obtaining wearer retina data. The wearer retina data relate at least to the shape of the retina of the wearer in the same reference frame as the wearing conditions are provided. The wearer retina data may correspond to standard retina shape or may correspond to the shape of the retina measured on the wearer or customized for example based on morphological or prescription of the wearer. The retina data may also be expressed in terms of optical power to be recorded in the Holographic Optical Element.

The method for manufacturing a lens element further comprises a step of manufacturing a second surface of the lens member based at least on the wearer prescription data.

According to an embodiment of the invention, the second surface of the lens member is further manufactured based on the wearing data.

The method for manufacturing a lens element further comprises a step of recording a holographic optical element within the holographic recording medium.

The holographic optical element is recorded so as to provide an additional optical power of opposite sign to the prescribed optical power so as to slow down the progression of the abnormal refraction of the eye.

When the abnormal refraction of the eye of the wearer corresponds to myopia, the additional optical power is positive and the holographic optical element is recorded to provide the effect of a refractive converging lens on the light coming from at least one object.

Alternatively, when the abnormal refraction of the eye of the wearer corresponds to hypermetropia, the additional optical power is negative and the holographic optical element is recorded to provide the effect of a refractive divergent lens on the light coming from at least one object.

The at least one object may be located at a finite distance of the recorded holographic optical element, alternatively the at least one object may be located at infinite distance of the recorded holographic optical element.

Preferably, the step of manufacturing the second surface of the lens member is performed before the step of recording the holographic optical element.

Advantageously, recording the holographic optical element after manufacturing the second surface of the optical lens facilitates the manufacture of the lens. Indeed, once the second surface of the lens member is manufactured and the optical function of the lens is defined, it becomes easier to record the holographic optical element to have it focus light in front/behind the retina of the user so as to slow down the abnormal refraction of the eye of the wearer.

According to another embodiment of the invention, the step of recording a holographic optical element may comprise at least recording a first holographic optical element and a second holographic optical element.

The first holographic optical element may be configured to provide the effect of a refractive lens on the light coming from an object at a finite distance of the holographic optical element.

The second holographic optical element may be configured to provide the effect of a refractive lens on the light coming from an object at infinite distance of the holographic optical element.

The first and second holographic optical elements may be recorded to have different portion of effective visible spectrum and/or angular band.

The first and second holographic optical elements may be recorded to provide the same additional power. Alternatively, the first and second holographic optical elements may be recorded to provide different additional powers.

At least one holographic optical element may be recorded to extend over the near vision point of the lens member.

The invention also relates to a lens member comprising:
a first optical surface having a surface design,
a second optical surface to be manufactured, and
at least one holographic optical element providing over a portion of the visible spectrum an optical power.

Advantageously, such lens member may be used to manufacture a lens element adapted for a wearer so as to slow down the progression of an abnormal refraction such as myopia.

Preferably, the at least one holographic optical element provides an optical power greater than or equal to 0.25 diopters, for example greater than or equal to 1.5 diopters.

The holographic optical element may be located on the first optical surface or between the first and second optical surfaces.

According to an embodiment of the invention, the at least one holographic optical element comprises and extends around the geometrical center of the first optical surface.

Preferably, the at least one holographic optical element has a surface area greater than 10% of the surface area of the first optical surface.

The lens member according to the invention may comprises at least two holographic optical elements having different portions of effective visible spectrum and/or angular band.

The invention also relates to a method for determining a lens element adapted to slow down the progression of the abnormal refraction of the eye of a wearer.

Figure 4:
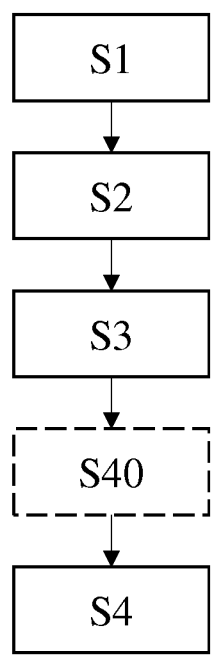
FIG. 4 is a flowchart of a method according to the invention.

As illustrated on FIG. 4, the method of the invention comprises at least:
a wearer prescription data providing step S1,
a wearing condition data providing step S2,
a wearer retina data providing step S3, and
a lens element determining step S4.

During the wearer prescription data providing step S1, wearer prescription data relating the prescription of the wearer are provided.

Wearing condition data relating to wearing conditions of the lens element by the wearer are provided during the wearer condition data providing step S2.

According to an embodiment of the invention, the wearing condition data provided during the wearing condition data providing step correspond to standard wearing conditions.

Alternatively, the wearing condition data provided during the wearing condition data providing step correspond to wearing conditions measured on the wearer or customized for example based on morphological or postural data relating to the wearer.

During the wearer retina data providing step S3, retina data relating to the shape of the retina of the wearer in the same reference frame as the wearing conditions are provided.

According to an embodiment of the invention, the wearer retina data provided during the wearer retina data providing step correspond to standard retina shape.

Examples of standard retina shapes are disclosed in "Refractive error, axial length, and relative peripheral refractive error before and after the onset of myopia" by Mutti DO1, Hayes J R, Mitchell G L, Jones L A, Moeschberger M L, Cotter S A, Kleinstein R N, Manny R E, Twelker J D, Zadnik K; CLEERE Study Group, Invest Ophthalmol Vis Sci. 2007 June; 48(6):2510-9.

Further examples of standard retina shapes are disclosed in "Peripheral refraction along the horizontal and vertical visual fields in myopia", by Atchison DA1, Pritchard N, Schmid K L, Vision Res. 2006 April; 46(8-9):1450-8.

Additional examples of standard retina shapes are disclosed in "Peripheral Refraction and Ocular Shape in Children", by Donald O. Mutti, Robert I. Sholtz, Nina E. Friedman, and Karla Zadnik in IOVS, April 2000, Vol. 41, No. 5.

Alternatively, the wearer retina data provided during the wearer retina data providing step may correspond to the shape of the retina measured on the wearer or customized for example based on morphological or prescription of the wearer. The retina data may also be expressed in terms of optical power to be recorded in the Holographic Optical Element.

During the lens element determining step S4 a lens element comprising a refractive element and at least one holographic optical elements is determined.

The lens element is determined so that the refractive element provides in wearing conditions corresponding to the wearing data and for foveal vision a first optical power based on the prescription of the wearer.

Furthermore, at least one holographic optical element is determined so as to provide additional optical power of opposite sign to the prescribed optical power.

When the abnormal refraction of the eye of the wearer corresponds to myopia, the additional optical power is positive and the holographic optical element is configured to provide the effect of a refractive converging lens on the light coming from at least one object.

When the abnormal refraction of the eye of the wearer corresponds to hypermetropia, the additional optical power is negative and the holographic optical element is configured to provide the effect of a refractive divergent lens on the light coming from at least one object.

The at least one object may be located at a finite distance of the holographic optical element, alternatively the at least one object may be located at infinite distance of the holographic optical element.

According to an embodiment of the invention, during the lens element determining step a plurality of holographic optical elements are determined having different portions of effective visible spectrum and/or angular band.

As illustrated on FIG. 4, the method of the invention may further comprise a front surface data providing step S40.

During the front surface data providing step S40, front surface data representative of the front or first surface of the lens element are provided.

According to such embodiment, during the lens element determining step the shape of the back or second surface and the holographic optical elements to be placed on the front surface are determined so that the refractive element provides in wearing conditions corresponding to the wearing data and for foveal vision a first optical power based on the prescription of the wearer and the at least one holographic optical element provides an addition optical power of opposite sign to the prescribed optical power. According to a preferred embodiment, during the lens element determining step the shape of the back surface is determined so that the refractive element provides in wearing conditions corresponding to the wearing data and for foveal vision a first optical power based on the prescription of the wearer.

The additional optical power of the holographic optical element is determined so as to focus light rays at a given distance of the retina of the eye, in particular for peripheral vision.

The invention has been described above with the aid of embodiments without limitation of the general inventive concept.

Many further modifications and variations will be apparent to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

In the sense of the invention, the term "obtaining" encompasses the terms "receiving" and "retrieving".

The invention claimed is:

1. A method for manufacturing a lens element wearable in front of an eye of a wearer, the method comprising:
    obtaining a lens member comprising a holographic recording medium disposed on a first surface of the lens member, the holographic recording medium being configured to be able to convert an interference pattern into a holographic optical element;
    obtaining wearer prescription data relating at least to the prescription of the wearer;
    manufacturing a second surface of the lens member based on the wearer prescription data; and
    recording a holographic optical element within the holographic recording medium to provide an additional optical power of opposite sign to a prescribed optical power to slow down progression of abnormal refraction of the eye,
    wherein the step of manufacturing the second surface of the lens member is performed before the step of recording the holographic optical element.

2. The method according to claim 1, wherein a first optical surface corresponds to the front surface of the lens member and/or a back surface of the lens member and/or a surface comprised between the front and the back surfaces.

3. The method according to claim 1, wherein the abnormal refraction of the eye of the wearer corresponds to myopia, the additional optical power is positive and the holographic optical element is recorded to provide the effect of a refractive converging lens on the light coming from at least one object.

4. The method according to claim 1, wherein the abnormal refraction of the eye of the wearer corresponds to hypermetropia, the additional optical power is negative and the holographic optical element is recorded to provide the effect of a refractive divergent lens on the light coming from at least one object.

5. The method according to claim 3, wherein the at least one object is located at a finite distance of the holographic optical element.

6. The method according to claim 3, wherein the at least one object is located at infinite distance of the holographic optical element.

7. The method according to claim 1, wherein the step of recording a holographic optical element comprises at least recording a first holographic optical element, the first holographic optical element being configured to provide the effect of a refractive lens on the light coming from an object at a finite distance of the holographic optical element, and recording a second holographic optical element, the second holographic optical element being configured to provide the effect of a refractive lens on the light coming from an object at infinite distance of the holographic optical element.

8. The method according to claim 1, wherein the step of recording a holographic optical element comprises at least recording a first holographic optical element and recording at least a second holographic optical element, the holographic optical elements being recorded to have different portion of effective visible spectrum and/or angular band.

9. The method according to claim 1, wherein at least two holographic optical elements are recorded to provide the same additional optical power.

10. The method according to claim 1, wherein the lens member comprises a near vision reference point and at least one holographic optical element is recorded to extend over said near vision reference point.

11. A lens member comprising:
a first optical surface having a surface design,
a second optical surface to be manufactured, and
a plurality of holographic optical elements positioned along a set of concentric rings and providing, over a portion of the visible spectrum, an optical power adapted to focus light rays at a given distance of the retina of the eye for peripheral vision.

* * * * *